United States Patent [19]

Richter et al.

[11] Patent Number: 5,180,288
[45] Date of Patent: Jan. 19, 1993

[54] MICROMINIATURIZED ELECTROSTATIC PUMP

[75] Inventors: Axel Richter; Herrmann Sandmeier, both of Munich, Fed. Rep. of Germany

[73] Assignee: Fraunhofer-Gesellschaft zur Förderung der Angewandten Forschung E.V., Müchen, Fed. Rep. of Germany

[21] Appl. No.: 773,897
[22] PCT Filed: Apr. 17, 1990
[86] PCT No.: PCT/EP90/00611
§ 371 Date: Oct. 29, 1991
§ 102(e) Date: Oct. 29, 1991
[87] PCT Pub. No.: WO91/02375
PCT Pub. Date: Feb. 21, 1991

[30] Foreign Application Priority Data

Aug. 3, 1989 [DE] Fed. Rep. of Germany ....... 3925749

[51] Int. Cl.$^5$ ............... H01J 41/18; F04D 33/00; H02N 11/00
[52] U.S. Cl. .................... 417/48; 417/53; 430/313; 430/323
[58] Field of Search ............ 417/49, 53, 48; 430/313, 323

[56] References Cited

U.S. PATENT DOCUMENTS

| | | | |
|---|---|---|---|
| 2,279,586 | 4/1942 | Bennett . | |
| 3,267,859 | 8/1966 | Jutila | 103/1 |
| 3,554,669 | 1/1971 | Reader | 417/48 |
| 3,665,241 | 5/1972 | Spindt et al. . | |
| 3,970,887 | 7/1976 | Smith et al. | 313/351 |
| 4,634,057 | 1/1987 | Coffee et al. | 417/48 |
| 4,960,659 | 10/1990 | Sagou | 430/323 |

OTHER PUBLICATIONS

Proceedings of the IEEE, vol. 70, No. 5, May 1982, Silicon as a Mechanical Material, Kurt E. Petersen, pp. 420-457.
Proceedings of the IEEE, Micro Electro Mechanical Systems, 1990, Feb. 11-14 1990, An Electrohydrodynamic Micropump, by Axel Richter and Hermann Sandmaier, pp. 99-104.
Sensors and Actuators, Feb. 1990, vol. A21, No. 1-3, Part II, Microfabricated Electrohydrodynamic Pumps, by Stephen S. Bart et al., pp. 193-197.

Primary Examiner—Richard A. Bertsch
Assistant Examiner—David W. Scheuermann
Attorney, Agent, or Firm—Ralph H. Dougherty

[57] ABSTRACT

An electrostatic pump includes two electrodes, which are spaced apart essentially in the pump flow direction and which are adapted to have applied thereto a potential for injecting an ion current flowing between the two electrodes. For further microminiaturization of the pump, the pump includes two semiconductor components, which are arranged one on top of the other in the pump flow direction and which are so structured that the electrodes form an integral constituent part of the semiconductor components.

21 Claims, 3 Drawing Sheets

MICROMINIATURIZED ELECTROSTATIC PUMP

FIELD OF THE INVENTION

The present invention relates to a microminiaturized electrostatic pump, and more particularly to a microminiaturized electrostatic pump having two electrodes in a non-conductive fluid which are spaced apart in the pump flow direction, the electrodes having applied thereto a potential for injecting or for accelerating an ion current which flows between said electrodes through the fluid.

BACKGROUND OF THE INVENTION

Electrostatic pumps operating without any moving parts have been known e.g. from U.S Pat. No. 4,634,057, from U.S. Pat. No. 3,398,685, as well as from U.S. Pat. No. 4,463,798 for a fairly long time. Such electrostatic pumps have at least two electrodes spaced apart essentially in the pump flow direction, the fluid (liquid or gas) to be pumped flowing around the electrodes. The electrodes are adapted to have applied thereto a d.c. potential or an a.c. potential so as to inject an ion current flowing between the electrodes through the fluid. The gases or liquids which are adapted to be pumped by means of an electrostatic pump are media, which are essentially non-conductive and which normally have a resistance value in the order of $10^7$ to $10^{10}$ ohm cm. The ions injected into the fluid by the electrode, which is normally provided with a sharp tip, run through the fluid upon moving to the opposite electrode. This relative movement of the ions in the fluid to be pumped produces the pumping action of such an electrostatic pump, which, consequently, is capable of functioning without any moving parts.

Typical electrostatic pumps according to the prior art, which is established, e.g., by U.S. Pat. No. 4,463,798 or by U.S. Pat. No. 4,634,057, consist essentially of a tubular housing member, which is constructed such that a fluid can flow therethrough in the axial direction and which is provided with a first centrally arranged electrode in the form of a cone tip arranged at an axial distance from the counter-electrode, such distance being normally adjustable by means of a thread, and the counter-electrode consisting essentially of a nozzle provided with a recess in the form of a truncated cone. The typical housing member of the known electrostatic pumps is made of plastic material. The electrodes, which consist of metal, are normally screwed into the housing member. The known electrostatic pump having the structure described not only requires comparatively high operating voltages in the order of 15 kV to 40 kV, but it also requires a complicated adjustment in order to set an appropriate electrode spacing. In addition, the structural design of the known electrostatic pump precludes any far-reaching miniaturization of such pump so that the possible fields of use of the known electrostatic pump are restricted.

U.S. Pat. No. 3,267,859 disclosed an electrostatic pump provided with a cylindrical housing of plastic material having arranged therein two spaced metal electrode plates whose electrodes have a web-shaped or edge-shaped cross-sectional configuration. This pump is not suitable for the purpose of microminiaturization.

OBJECT OF THE INVENTION

It is the principal object of the present invention to provide a microminiaturized electrostatic pump, which is further miniaturized beyond what has been known before.

SUMMARY OF THE INVENTION

The foregoing object is achieved by providing two semiconductor components, which are arranged one on top of the other essentially in the pump flow direction, and which are so structured that the electrodes form an integral constituent part of the semiconductor components.

The present invention is based on the finding that the complicated structure of an electrostatic pump, which is disclosed in the prior art and which is opposed to further miniaturization, as well as the electrode adjustment problem can be avoided by composing the electrostatic pump of two semiconductor components, which are arranged one on top of the other in the pump flow direction and each of which is structured such that the electrodes define an integral constituent part of the semiconductor components. A microminiaturized electrostatic pump constructed in accordance with this teaching of the present invention can be produced by the high-precision photolithographic etching methods, which are known in the field of semiconductor technology. Due to the fact that the electrodes are formed integrally with the semiconductor components, a very far-reaching miniaturization is possible so that the invented microminiaturized electrostatic pump is also suitable for new fields of use, such as the integration into micromechanical structural units. As one example where such an integration into micromechanical structural units is used, the invented microminiaturized electrostatic pump is used as a heat pump for cooling electronic components. In view of the fact that, by means of photolithographic processes, semiconductors can be structured with accuracies below the micrometer range, this structural design of the invented microminiaturized electrostatic pump permits an adequate high-precision fixation of the two electrodes relative to each other, so that even in the case of very low operating voltages the electrodes will be able to reliably maintain the very small mutual distance which will then be necessary.

BRIEF DESCRIPTION OF THE DRAWINGS

Preferred embodiments of the present invention will be explained in detail hereinbelow with reference to the appended drawings, in which.

DETAILED DESCRIPTION

Figure 1:
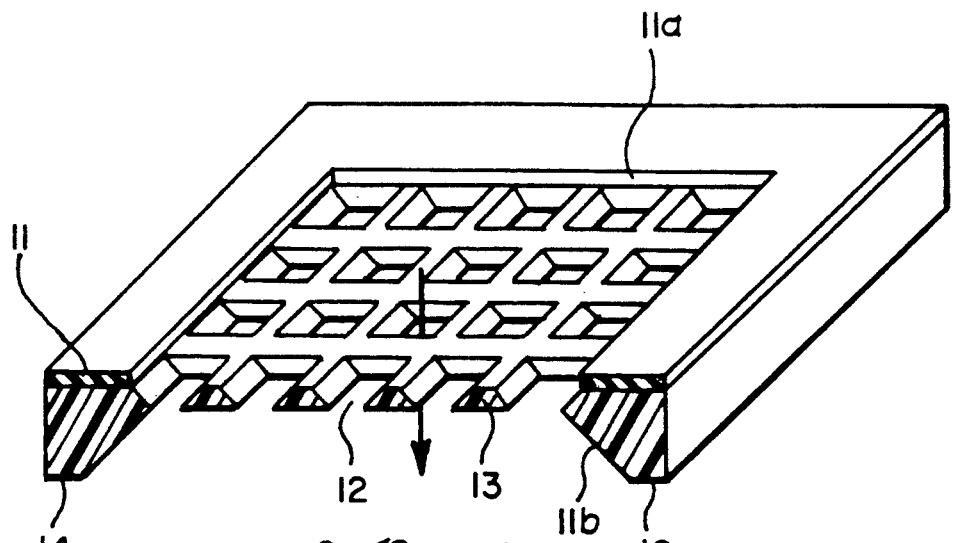
FIG. 1 shows a perspective view, part of which is a sectional view, of a semiconductor component forming a constituent part of an embodiment of the pump according to the invention.

FIG. 1 shows one of the two semiconductor components, which are contained in a first embodiment of an electrostatic pump according to the present invention. This semiconductor component is a single-crystal silicon semiconductor component, which is provided with reference numeral 10 in its entirety. This silicon semiconductor component 10 is preferably n+-conductive, but said component 10 may also be provided with doped epitactical or diffused areas. In the embodiment shown, the single-crystal silicon semiconductor component 10 has a (100) crystal orientation. On the front of the silicon semiconductor component 10, an insulating layer 11 is provided, which has a front recess 11a in at least one flow-through region. The single-crystal silicon semiconductor component is additionally provided with a rear recess 11b, which also extends at least over the flow-through region. In the area between front recess 11a and rear recess 11b, the single-crystal silicon component is provided with a grid-shaped electrode 13 having a plurality of prism-shaped pits 12 which define the flow-through region. The grid-shaped electrode 13 is an integral component of the silicon semiconductor component 10.

The structure of the silicon semiconductor component 10 described above is produced by manufacturing techniques in the field of semiconductor technology which are known per se, in a photoetch process. For this purpose, the still unstructured single-crystal silicon semi-conductor component 10 has first deposited thereon the electric insulating layer 11. In the preferred embodiment, this is done by depositing a Pyrex glass layer on a thermally produced silicon dioxide layer by means of cathode sputtering. The recess 11a is opened on the front side by any suitable method. In the embodiment shown in FIG. 2, an area 24 is simultaneously opened on the front side, area 24 being later provided with an ohmic contact to the silicon semiconductor component 21.

Subsequently, the silicon semiconductor component, which has been structured to the above-described extent, has applied thereto throughout its whole surface a layer, which is resistant to alkaline etching solutions, and which may, for example, consist of silicon nitride, such layer being applied to the front and to the back of silicon semiconductor component 10. This layer serves as an etch stop mask and within the previously opened area of the front recess 11a it is photolithographically structured by conventional methods. Subsequently, an anisotropic etching process takes place, in the course of which the prism-shaped pits 12 are produced. If grid-shaped electrode structures 13 with steeper edges are desired, isotropic etching processes may be used as well. In the case of the preferably used anisotropic etching process employed for producing the structure of the grid-shaped electrode 13 shown in FIG. 1, a 30% KOH solution is used as an etching solution. Depending on the desired thickness of the grid-shaped electrode 13 produced later, the depth of the prism-shaped pits 12 is between 1 $\mu$m and 200 $\mu$m. The front of the structure now has applied thereto an additional etch stop layer throughout its whole surface, and such layer can again consist of silicon nitride. Subsequently, after an adequate photolithographic treatment, the rear recess 11b is etched in an anisotropic etching process to such an extent that the lower areas of the prism-shaped pits 12 are reached, whereby the grid-shaped electrode structure of electrode 13 is obtained. Residues of the etch stop layer (not shown) are now removed, a thin oxide film, which has formed on the silicon, is removed, and the grid-shaped electrode 13 is then provided with a metallic coating by conventional methods.

Depending on the intended use of the invented electrostatic pump, the size of the recesses 11a, 11b and consequently, the size of the grid area 13 is between approximately 0.1 mm $\times$ 0.1 mm and approximately 10 mm $\times$ 10 mm. Typical sizes of the openings of the grid, which are defined by the prism-shaped pits 12, lie between 1 $\mu$m $\times$ 2 $\mu$m and 1 mm $\times$ 1 mm.

Deviating from the grid-shaped structure of the electrode 13 shown in FIG. 1, the electrode 13 can have a strip-shaped or web-shaped structure.

In another embodiment variation from the embodiment shown in FIG. 1, cone tips (not shown) produced by deposition methods can be arranged at the points of intersection of the grid-shaped electrode 13, whereby it is possible to achieve a concentration of ion injection at specific point areas in comparison with the ion current distribution which can be produced by means of the grid-shaped electrode 13.

Figure 2:
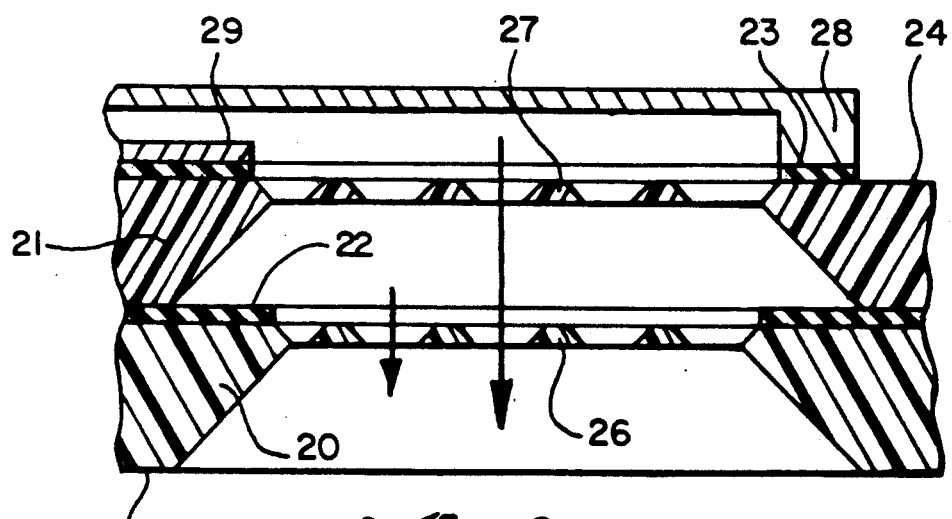
FIGS. 2 to 7 show cross-sectional representations of various embodiments of the electrostatic pump according to the present invention.

FIG. 2 shows a cross-sectional representation of an additional embodiment of the microminiaturized electrostatic pump according to the present invention. This embodiment comprises two semiconductor components 20, 21, which are arranged one on top of the other in the pump flow direction and each of which includes respective grid-shaped or web-shaped electrodes 26, 27 opposed to each other essentially in the pump flow direction. In this embodiment, which is essentially formed by fitting together two semiconductor components of the type shown in FIG. 1, two respective electrodes 26, 27 of the semiconductor components 20, 21 are positioned essentially on one level with the front sides of the semiconductor components 20, 21 and they are arranged in spaced relationship with the reverse sides of said semiconductor components 20, 21. The two semiconductor components 20, 21 are preferably interconnected by connecting, with the aid of electrostatic bonding, the reverse side of the upper semiconductor component 21 to the Pyrex glass layer forming the insulating layer 22 of lower semiconductor component. In this embodiment and the embodiments which follow hereinafter, other connecting methods, such as wafer bonding or gluing, may be used alternatively. In the embodiment according to FIG. 2, the distance between the grid- or web-shaped electrodes 26, 27 essentially corresponds to the thickness of the starting material, i.e. the untreated single-crystal silicon semiconductor component.

Deviating from the embodiment according to FIG. 2, the grid-shaped electrode 13 can be etched back from the front side of the semiconductor component 20, 21.

In the embodiment of the electrostatic pump shown in FIG. 2, the upper semiconductor component 21 is connected to a cover member 28 in the area of its insulating layer 23, said cover member 28 including one or a plurality of outlet nozzles 29.

Figure 3:
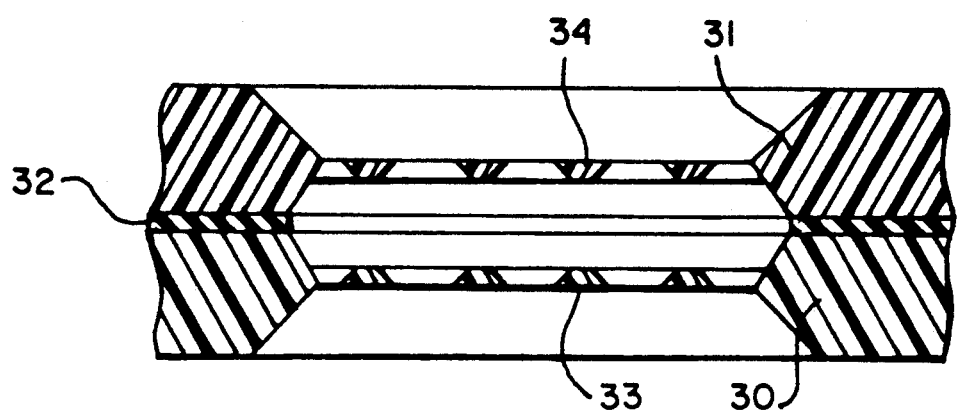

The embodiment of the electrostatic pump is shown in FIG. 3 differs from the FIG. 2 embodiment essentially insofar as the two semiconductor components 30, 31 are here interconnected on their front sides in the area of their respective insulating layer 32. The electrodes 33, 34 are here etched back relative to the front sides of the semiconductor components 30, 31, and this means that the mutual distance of the two electrodes 33, 34 is determined by the extent of etching back as well as by the thickness of the insulating layer 32. It follows that, in this embodiment, the grid distance between the electrodes 33, 34, or the web distance in cases in which a web-shaped electrode is chosen, can be adjusted on the basis of the extent of etching back relative to the front side and on the basis of the thickness of the insulating layer 32.

Figure 4:
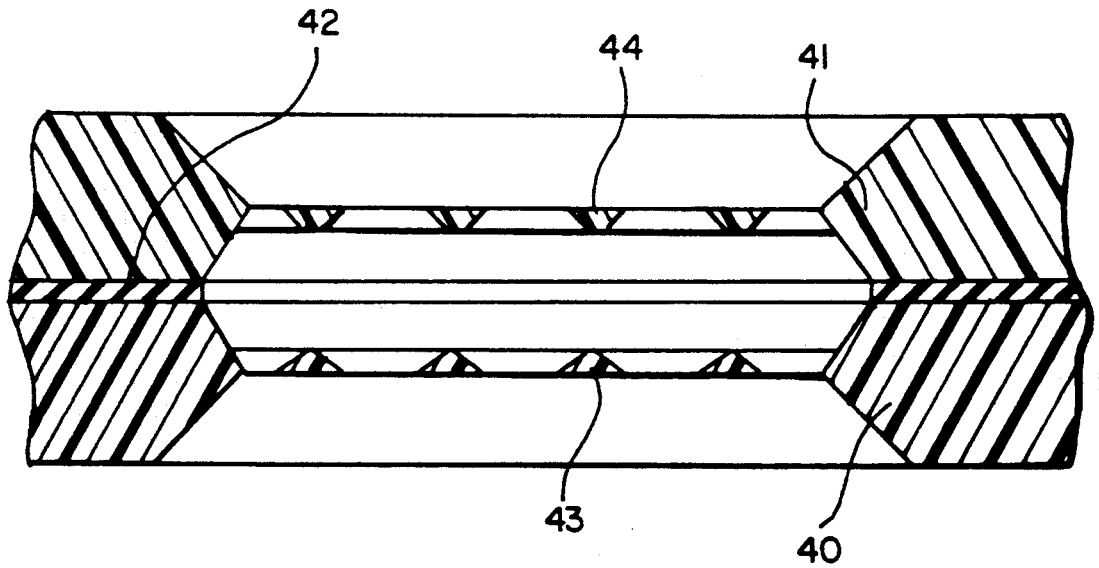

The further modification of the electrostatic pump shown in FIG. 4, which comprises two semiconductor components 40, 41 interconnected in the area of the front insulating layer 42, differs from the embodiment according to FIG. 3 only insofar as one electrode 43 of the two electrodes 43, 44 has a web width of the web structure or of the grid structure which is so narrow that, due to the lateral under-etching of the etch stop layer, an edge-like electrode 43 is formed, which particularly promotes the injection of ions into the fluid due to the high field strength at the edge.

Figure 5:
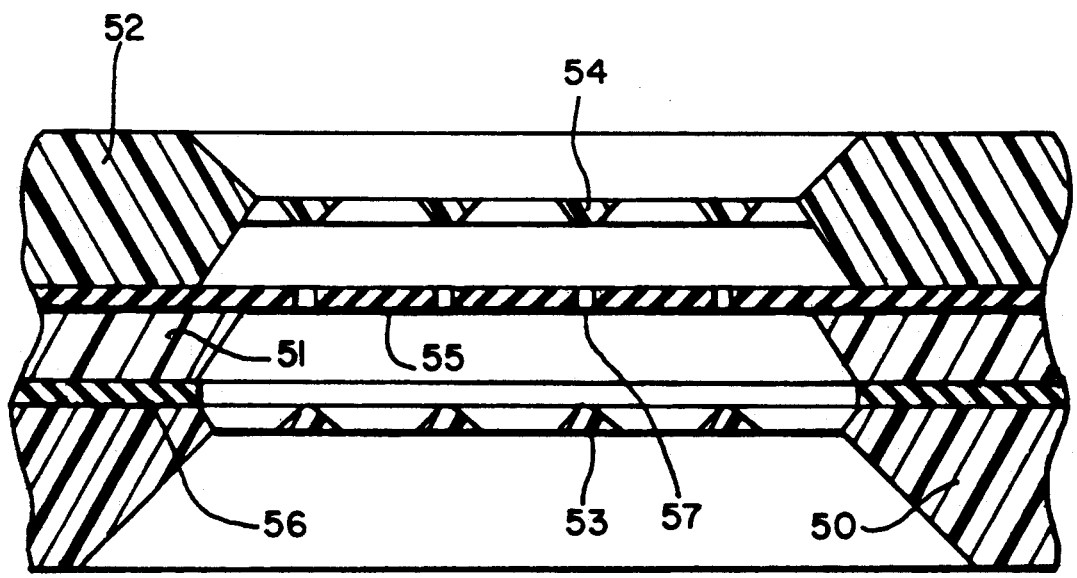

The embodiment of the electrostatic pump shown in FIG. 5 differs from the embodiment according to FIG. 4 essentially insofar as a third semiconductor component 51 with an insulating partition 55 is provided between the two semiconductor components 50, 52 with the associated strip-shaped or web-shaped electrodes 53, 54, which are set back relative to the respective front side of the semiconductor component, insulating partition 55 having formed therein flow-through openings 57 only in the area of the opposed web-shaped electrodes 53, 54. This embodiment preferably includes the feature that, in the area of its insulating layer 56, the first semiconductor component 50 has its front side connected to the reverse side of the third semiconductor component 51 by means of electrostatic bonding. In the area of the insulating partition 55, said third semiconductor component 51 is connected to the front side of the second semiconductor component 52 again by means of electrostatic bonding.

A more strongly modified embodiment of the invented microminiaturized electrostatic pump will now be explained with reference to FIG. 6. In this embodiment, one component 61 of the two semiconductor components 60, 61 has an edge-shaped spacer 62, which comes into engagement with a groove 62a of the other semiconductor component 60. Furthermore, semiconductor component 61 is provided with an edge-like injector 63. The other semiconductor component 60 is provided with an essentially V-shaped opening 64, which is located in the area of the edge-like injector 63 of semiconductor component 61 and which maintains, in the area of the injector 63, such a distance between the two semiconductor components 60, 61 that a flow-through gap 64–65 of reduced width is defined. On its side facing said one semiconductor component 61, the other semiconductor component 60 is covered with an insulating layer 67, which extends not only over the groove 62a but also over an essential pert of the V-shaped opening 64 so that the opposed electrodes are defined on the one hand by the tip of the edge-like injector 63 and on the other hand by the border areas of the opening 64 of the other semiconductor component 60, such border 10 areas being located adjacent the tip.

In the area of the flow-through gap between the injector 63 and the opening 64 of the two semiconductor components 60, 61, a groove-shaped or gap-shaped inlet nozzle 65 is provided. With the exception of the area of engagement at the location of the spacer 62, the two semiconductor components 60, 61 are spaced apart by a free space 66.

Figure 6:
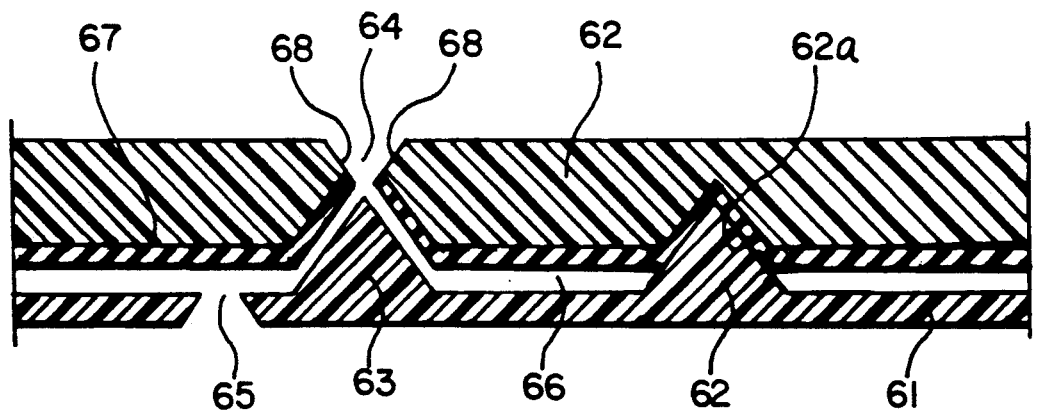
Figure 7:
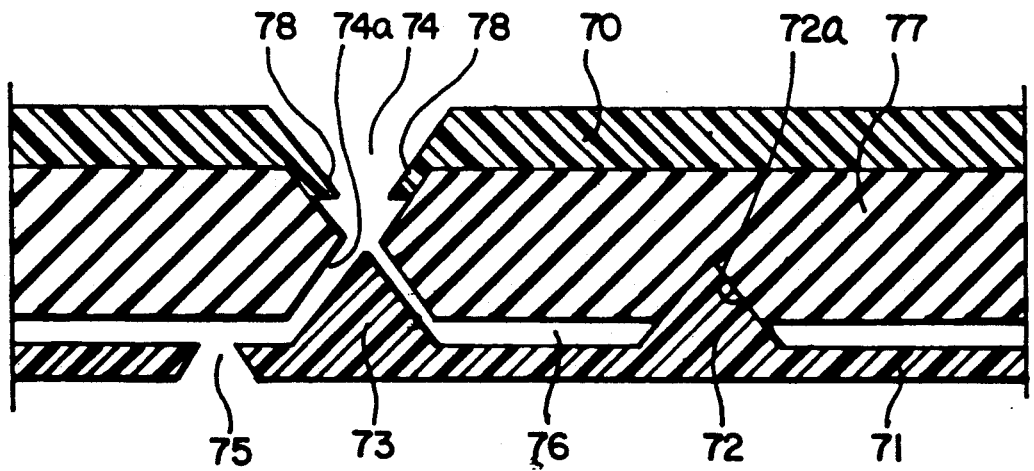

The embodiment shown in FIG. 7 differs from the embodiment of FIG. 6 essentially insofar as an insulating body 77 is arranged between the two semiconductor components 70, 71. One of the two semiconductor components 71 engages via its spacer 72 a groove 72a of the insulating body 77, thus defining by this fixed position a free space 76 between the insulating body 77 and semiconductor component 71. In conformity with the previously described embodiment, also the present semiconductor component 71 is provided with an edge-like injector 73 defining together with a V-shaped opening 74a of the insulating body 77 a flow-through gap 74–75, which terminates in the area of a groove-shaped inlet nozzle 75 of the semiconductor component 71. The other semiconductor component 70 is provided with a V-shaped opening 74 located above the opening 74a of the insulating body 77 and defining acute-angled electrode edge portions 78, which form the counter-electrodes to the edge-shaped injector 73.

For operating the electrostatic pump, the semiconductor components 20, 21; 30, 31; 40, 41; 50, 51; 60, 61; 70, 71 are respectively connected to a d.c. source via ohmic contacts (cf. reference numerals 24, 25 according to FIG. 2) so that an electric potential difference between the two electrodes is created, such electric potential difference being sufficient to inject ions into the fluid (gas or liquid) to be pumped.

ALTERNATIVE EMBODIMENTS

It is readily apparent that, for increasing the quantity delivered by the pump according to the present invention, several pump components of the type shown in FIG. 2 to 7 may be connected in parallel. Furthermore, it is also possible to connect several pumps of this type in series, if this should be desirable for reasons of increased pressure. And it is equally possible to arrange more than two semiconductor components, one on top of the other, instead of a series connection of pumps.

Instead of the preferably used semiconductor material silicon, all other semiconductor materials can be used as a starting material as well.

Each of the embodiments shown can be provided with additional inlet and outlet nozzles, although this is only shown in the case of the embodiments according to FIG. 2, 6 and 7.

Finally, the invented pump can also be employed for generating a static pressure so that the term "pump", which has been used in the present connection, is intended to comprise also cases of use in which a fluid without any fluid flow only has to have pressure applied thereto. Furthermore, the term "pump" as used in the present application is also intended to cover any means used for accelerating or for decelerating a fluid flow.

What is claimed is:

1. A microminiaturized electrostatic pump including two electrodes (13; 26, 27; 33, 34; 43, 44; 53, 54; 63, 68; 73, 78), which are arranged in a essentially non-conductive fluid to be pumped and which are spaced apart essentially in the pump flow direction, said electrodes being adapted to have applied thereto a potential for injecting or for accelerating an ion current which flows between said electrodes through said fluid, and further including two components (10; 20, 21; 30, 31; 40, 41; 50, 52; 60, 61; 70, 71), which are arranged one on top of the other essentially in the pump flow direction and which are structured by etched openings in such way that the electrodes form an integral constituent part of said semiconductor components;

characterized in that components (10; 20, 21; 30, 31; 40, 41; 50, 52; 60, 61; 70, 71) and the electrodes (13; 26, 27; 33, 34; 43, 44; 53, 54; 63, 68; 73, 78) consist of a semiconductor material, the main surfaces of said components (10; 20, 21; 30, 31; 40, 41; 50, 52; 60, 61; 70, 71) extend at right angles to the pump flow direction, and the etched openings (12) extend through the components in the pump flow direction at both sides of each electrode.

2. A microminiaturized electrostatic pump according to claim 1, characterized in that the electrodes (13; 26, 27; 33, 34; 43, 44; 53, 54; 63, 68; 73, 78) consisting of a semiconductor material are provided with a metallic coating on their surfaces.

3. A microminiaturized electrostatic pump according to claim 1,
characterized in that the electrodes (26, 27) of both semiconductor components (20, 21) are respectively positioned on one level with the front side of said semiconductor components (20, 21) and are respectively arranged in spaced relationship with the reverse side of said semiconductor components (20, 21) and
that the semiconductor components (20, 21) are arranged in such manner that the reverse side of one semiconductor component (21) is connected to the front side (22) of the other semiconductor component (20).

4. A microminiaturized electrostatic pump according to claim 1,
characterized in that the electrodes (33, 34; 43, 44; 53, 54) of both semiconductor components (30, 31; 40, 41; 50, 52) are arranged in spaced relationship with the front sides of said semiconductor components, and
that said semiconductor components have their respective front sides interconnected.

5. A microminiaturized electrostatic pump according to claim 1,
characterized in that the semiconductor components (20, 21; 30, 31; 40, 41; 50, 51, 52; 60, 61; 70, 71) are glued together.

6. A microminiaturized electrostatic pump according to claim 1,
characterized in that an insulating body (77) is arranged between the two semiconductor components (70, 71),
that one (71) of the two semiconductor components (70, 71) is provided with a spacer (72) and with an edge-like injector (73),
that the insulating body (77) is provided with an essentially V-shaped opening (74a) defining together with said edge-like injector (73) a flow-through gap (74-75), and
that, in the area of the essentially V-shaped opening (74a) of the insulating body (77), the other semiconductor component (70) defines at least one counter-electrode (78) cooperating with said edge-like injector (73).

7. A microminiaturized electrostatic pump according to claim 1,
characterized in that the semiconductor components (10; 20, 21; 30, 31; 40, 41; 50, 51, 52; 60, 61; 70, 71) have been structured by means of photoetch processes.

8. A microminiaturized electrostatic pump according to claim 1,
characterized in that the electrodes (13; 26, 27; 33, 34; 43, 44; 53, 54; 63; 73) have a web-shaped structure.

9. A microminiaturized electrostatic pump according to claim 8,
characterized in that the web-shaped electrodes (26, 27; 33, 34; 43, 44) of the two semiconductor components (20, 21; 30, 31; 40, 41; 50, 52) are arranged in essentially opposed relationship with one another.

10. A microminiaturized electrostatic pump according to claim 1,
characterized in that at least one of the electrodes (43; 53; 63; 73) is triangular or wedge-shaped.

11. A microminiaturized electrostatic pump according to claim 10,
characterized in that the two semiconductor components (50, 52) have arranged between them a third semiconductor component (51) defining a partition (55) which extends essentially at right angles to the direction of flow and which has formed therein flow-through openings (57) only in the area of the essentially opposed web-shaped electrodes (53, 54).

12. A microminiaturized electrostatic pump according to claim 1,
characterized in that the semiconductor components (20, 21) are interconnected by electrostatic bonding.

13. A microminiaturized electrostatic pump according to claim 12,
characterized in that at least one (20) of the semiconductors components (20, 21) interconnected by electrostatic bonding is provided with a pyrex glass layer, which has been applied by cathode sputtering and which is provided in the area of connection with the other semiconductor component (21).

14. A microminiaturized electrostatic pump according to claim 1,
characterized in that one (61) of the two semiconductor components (60, 61) is provided with a spacer (62) for engagement with the other semiconductor component (60) and with an edge-like injector (63), and
that the other semiconductor component (60) is provided with an opening (64), which is essentially V-shaped in cross-section and which defines together with the edge-like injector (63) a flow-through gap (64-65).

15. A microminiaturized electrostatic pump according to claim 14,
characterized in that the other semiconductor component (60) is provided with an insulating layer (67), which covers the side of said component (60) facing said semiconductor component (61) and which extends from said side over at least part of said essentially V-shaped opening (64).

16. A microminiaturized electrostatic pump according to claim 1,
characterized in that the electrodes (13; 26, 27; 33, 34; 43, 44) have a grid-shaped structure.

17. A microminiaturized electrostatic pump according to claim 16,
characterized in that the grid-shaped electrodes (26, 27; 33, 34; 43, 44) of the two semiconductor components (20, 21; 30, 31; 40, 41; 50, 52) are arranged in essentially opposed relationship with one another.

18. A microminiaturized electrostatic pump according to claim 16,
characterized in that the flow-through region of the semiconductor components (10) has an area from 0.1 mm×0.1 mm up to 10 mm×10 mm.

19. A microminiaturized electrostatic pump according to claim 18,
characterized in that the mutual distance between the electrode webs of the electrode of the same semiconductor component is in the range of from 2 $\mu$m to 1 $\mu$mm.

20. A microminiaturized electrostatic pump according to claim 18, characterized in that the distance between the opposed electrodes (26, 27; 33, 34; 43, 44; 53, 54; 63, 68; 73, 78) of the two semiconductor components (20, 21; 30, 31; 40, 41; 50, 52; 60, 70, 71) is between 5 μm and 500 μm.

21. A method of producing a microminiaturized electrostatic pump including two electrodes (13; 26, 27; 33, 34; 43, 44; 53, 54; 64, 68; 73, 78), which are arranged in an essentially non-conductive fluid to be pumped and which are spaced apart essentially in the pump flow direction, said electrodes being adapted to have applied thereto a potential for injecting or for accelerating an ion current which flows between said electrodes through said fluid and further including two components (10; 20, 21; 30, 31; 40, 41; 50, 52; 60, 61; 70, 71), which are arranged one on top of the other essentially in the pump flow direction and which are structured by etched openings (12) in such a way that the electrodes form an integral constituent part of the respective component, the components being semiconductor components (10), the method comprising;

applying a layer which is resistant to etching agents to one side of the semiconductor component (10);

photolithographically structuring with etch windows the layer which is resistant to etching agents; and starting from the etch windows of the etching agent-resistant layer, etching openings (12) through the semiconductor component (10) thereby defining web-shaped or grid-shaped electrodes in the pump flow direction.

* * * * *